Oct. 22, 1957     H. TEICHMANN     2,810,159
EXTRUSION PRESS
Filed June 17, 1955     3 Sheets-Sheet 1
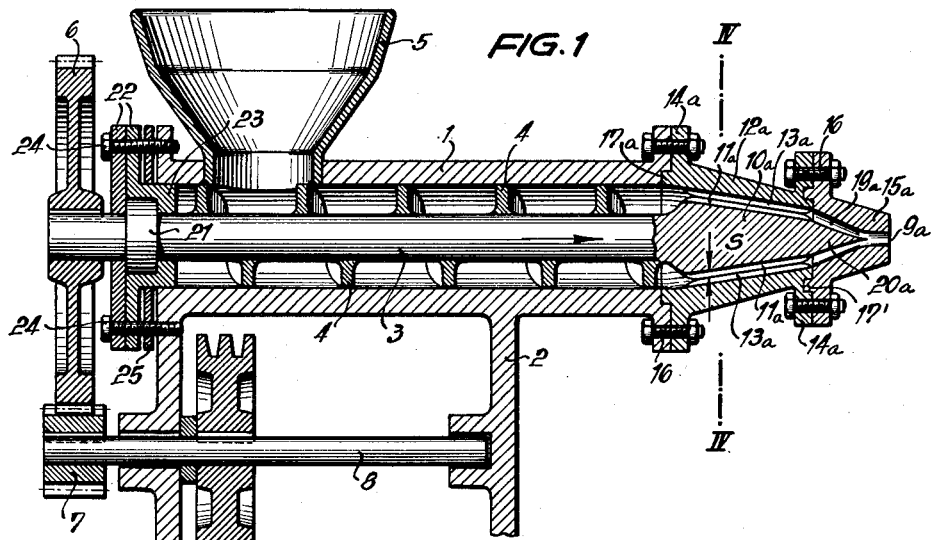
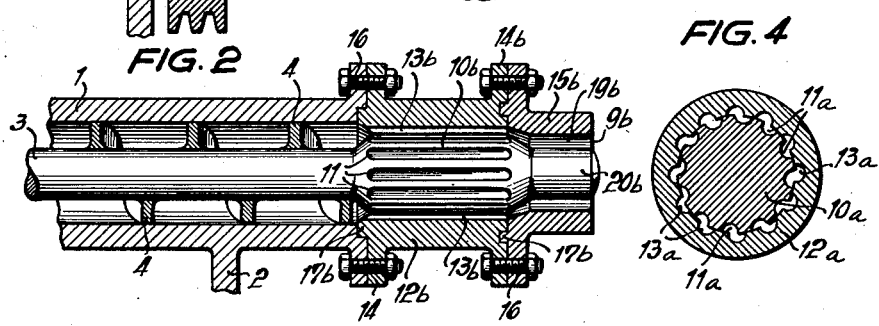
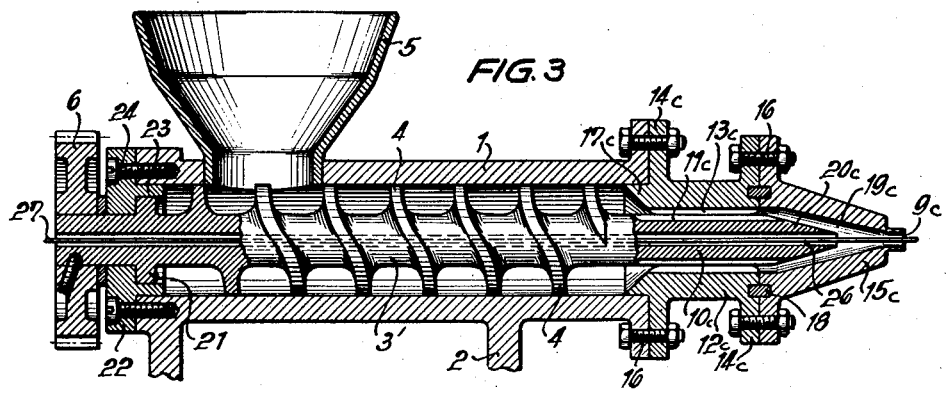
INVENTOR
Herrmann Teichmann
by:
Michael S. Striker
agt.

Oct. 22, 1957

H. TEICHMANN 2,810,159

EXTRUSION PRESS

Filed June 17, 1955

INVENTOR
Herrmann Teichmann
by:
Michael S. Striker
agt.

Oct. 22, 1957 H. TEICHMANN 2,810,159
EXTRUSION PRESS

Filed June 17, 1955 3 Sheets-Sheet 3

INVENTOR
Herrmann Teichmann
by:
Michael S. Striker
agt.

United States Patent Office 2,810,159
Patented Oct. 22, 1957

2,810,159
EXTRUSION PRESS

Herrmann Teichmann, Wolfratshausen, Upper Bavaria, Germany, assignor to Krauss-Maffei Aktiengesellschaft, Munich-Allach, Germany Application June 17, 1955, Serial No. 516,129

Claims priority, application Germany July 12, 1954

15 Claims. (Cl. 18—12)

The present invention relates to an extrusion press.

More particularly, the present invention relates to an extrusion press for extruding thermoplastics of high molecular weight such as polyvinylchloride.

Presses for extruding thermoplastics of this type are known, but all of the conventional presses of this type have serious disadvantages. Thus, these known presses have certain areas where the thermoplastic material becomes lodged without moving through the press, and in these "dead spaces" the temperature of the material frequently rises sufficiently to cause decomposition and breaking down of the material which necessitate stopping the entire operation, disassembling the entire press, cleaning all of its components carefully, and then reassembling the press and again starting the operations. Furthermore, such plastics have very poor heat conductivity so that it is necessary to provide extremely intense heat in order to properly heat the material during the extrusion thereof, and such heating devices can cause decomposition of the material. Another factor involved is the change from one color to another in the material in the extrusion press. The dead spaces of the conventional presses retain material of a given color therein so that when material of a different color is to be extruded it is first necessary to disassemble and clean the press in order to remove all material of an undesired color. A further disadvantage of conventional presses resides in the fact that they must be made of an extremely large size in order to produce an output of any substantial magnitude.

One of the objects of the present invention is to overcome the above drawbacks by providing a press which is absolutely free of any dead spaces through which material will not progress toward the outlet nozzle, so that in this way the danger of decomposition is reduced to a minimum.

Another object of the present invention is to provide an extrusion press capable of providing a very large output and being much smaller in size than any known presses which have comparable output.

A further object of the present invention is to provide a press which is capable of heating the material without requiring any special heating apparatus for this purpose.

A still further object of the present invention is to provide an extrusion press with a means for adjusting the extent to which heat is generated in the press.

An additional object of the present invention is to provide a press which is capable of efficiently handling raw material in the form of relatively coarse particles without any danger of causing the press to become stopped up or any danger of causing the pressure within the press to build up to dangerous proportions.

Furthermore, it is an object of the present invention to provide a press with interchangeable parts enabling most of the press to be used for many different types of extrusion while only the interchangeable parts are removed and exchanged to adapt the press for different operations.

It is also an object of the present invention to provide an extrusion press capable of accomplishing all of the above objects and at the same time made up of simple and ruggedly constructed parts which are easy to manufacture, to assemble, and to disassemble, and which guarantee faultless operation for a long period of time.

With the above objects in view, the present invention mainly consists of an extrusion press which includes a tubular housing having an open outlet end and a shaft coaxial with the housing, turnably carried thereby, and extending along the interior thereof. A worm screw is fixed to the shaft for rotation therewith and extends from the shaft toward the inner surface of the tubular housing. A milling head is coaxially fixed to the shaft for rotation therewith and is located beyond the outlet end of the tubular housing, this milling head being formed in its outer surface with axially extending grooves. A tubular milling casing closely surrounds this milling head and is fixed coaxially to the outlet end of the tubular housing, the casing also being formed in its inner face with axially extending grooves and having an open outlet end distant from the outlet end of the housing. A nozzle is fixed coaxially to the outlet end of the casing, and a milling head end portion is fixed coaxially to the portion of the milling head within the casing and extends into the nozzle, this milling head end portion having an outer surface spaced from and corresponding to the shape of the inner surface of the nozzle and extending only in the direction of material flow so that there are no dead spaces between the nozzle and milling head end portion in which material can remain without moving out through the nozzle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of one embodiment of an extrusion press constructed in accordance with the present invention, the section of Fig. 1 being taken in a central plane of the extrusion press;

Fig. 2 is a fragmentary sectional view also taken along a central plane and showing a different embodiment of an extrusion press constructed in accordance with the present invention;

Fig. 3 is a sectional elevational view of a third embodiment of an extrusion press embodying features of the present invention;

Fig. 4 is a sectional view taken along line IV—IV of Fig. 1;

Fig. 5 is a fragmentary sectional view showing the outlet end of yet another embodiment of an extrusion press constructed according to the present invention;

Fig. 6 is a sectional elevational view of the outlet end of a still further embodiment of an extrusion press of the present invention.

Figure 7:
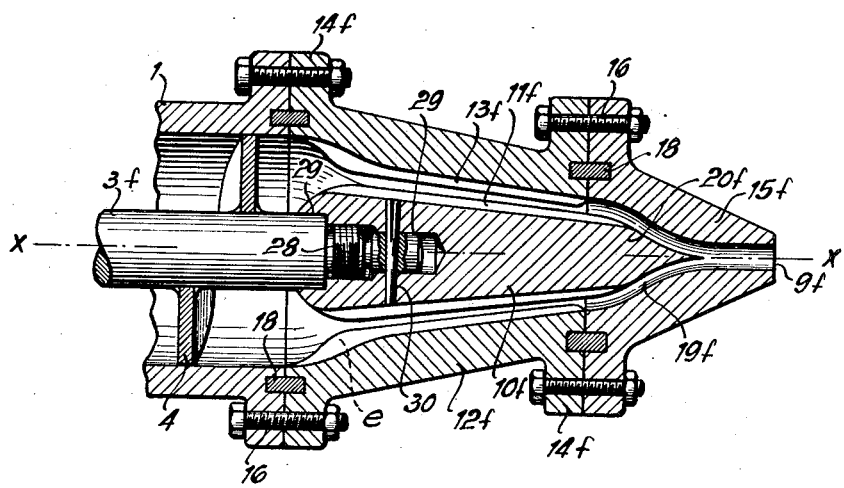
Fig. 7 is a sectional elevational view of a still further embodiment of a press constructed in accordance with the present invention.

Referring now to the drawings, the embodiment of Fig. 1 includes a tubular press housing 1 of the extrusion press 2 and a shaft 3 turnably carried by the housing 1 and extending coaxially along the interior thereof. A worm screw 4 is fixed to the shaft 3 for rotation therewith and extends therefrom to the inner surface of the housing 1. Upon rotation of the shaft 3 together with the worm screw 4, the material within the press is transported to the right in the direction of the arrow shown in Fig. 1. The raw material is supplied to the press through a hopper 5 carried by and communicating with the interior of housing 1 adjacent the left end thereof, as viewed in Fig. 1.

The shaft 3 extends at its left end portion, as viewed in Fig. 1, out of the housing 1, and a gear 6 is fixed to the shaft 3 at its outer left free end portion shown in Fig. 1. This gear 6 meshes with a pinion 7 which is substantially wider than the gear 6, as is evident from Fig. 1. Pinion 7 is fixed to a shaft 8 which is rotatably carried by suitable bearings of the press 2, as indicated in Fig. 1, and a pulley is fixed to the shaft 8 so that the pulley together with the shaft 8 and pinion 7 may be driven by any suitable belt drive so as to rotate the shaft 3 and the worm screw 4. If desired, however, the pinion 7 may be directly connected to the shaft of a driving motor. Of course, it is also possible to drive the shaft 3 with means other than gears 6 and 7 as for example with a flat or V-belt drive, with a drive capable of changing its driving speed in a stepless manner, or any similar drive.

The tubular housing 1 has an open outlet end at its right extremity, as viewed in Fig. 1, and a milling casing 12a is fixed coaxially to this outlet end of the housing 1 in a manner described below. The milling casing 12a closely surrounds a milling head 10a which is fixed coaxially to the shaft 3, as by being formed integrally therewith, and which is located beyond the outlet end of the housing 1. As is apparent from Fig. 1, milling head 10a and milling casing 12a have the shape of a truncated cone. The milling head and milling casing taper toward the outlet end 9a of the press. Milling head 10a is formed in its outer surface with axially extending grooves 11a, and these grooves are of uniform depth and width and have rounded bottom portions. The height s of the ribs located between the grooves 11a gradually diminishes at the ends of these ribs, so that there are no dead spaces of the type referred to above.

The milling casing 12a which closely surrounds the milling head 10a is formed in its inner surface with axially extending grooves 13a which also have a uniform depth and width and which are approximately of the same length as the grooves 11a. The bottom surfaces of the grooves 13a are also rounded. As may be seen from Fig. 4, grooves 11a and 13a have a substantially semicircular cross-section. The casing 12a and milling head 10a form together a structure for milling and kneading the plastic material which is extruded.

The casing 12a is provided at its opposite ends with flanges 14a for connecting the casing 12a with the housing 1 on the one hand and with the nozzle 15a on the other hand, screws 16 being provided for this purpose as indicated in Fig. 1. To guarantee a coaxial connection between casing 12a and housing 1 and nozzle 15a, the casing 12a is provided with an annular end 17a extending into an annular notch formed in the outlet end face of the housing 1, and the nozzle 15a is provided with an annular ring portion 17' extending into a mating annular groove formed in the right end face of casing 12a, as viewed in Fig. 1. It is also possible to use other centering devices, such as dowel pins, etc., for centering casing 12a with respect to housing 1 and nozzle 15a to guarantee that these elements are all coaxial.

In the embodiment of Fig. 1, the nozzle 15 is formed with a tapered bore 19a which has a shape corresponding to the profile of the finished product. Thus, if the finished product is circular in cross-section, then the bore 19a is conical, while if the profile of the finished product is to be polygonal, then the bore 19a will have the configuration of a pyramid.

A milling head end portion 20a is fixed coaxially to milling head 10a, as by being formed integrally therewith, and this milling head end portion 20a extends into the nozzle 15a and terminates short of the outlet 9a so that the press of Fig. 1 will extrude a solid bar. The outer surface of end portion 20a is spaced from and corresponds to the shape of the surface of bore 19a, and it will be noted that this outer surface of end portion 20a extends exclusively in the direction of material flow so that there are absolutely no dead spaces between nozzle 15a and milling head end portion 20a in which material may become lodged without progressing toward the outlet 9a.

Thus, it will be seen that with the structure of Fig. 1 the material transported by the worm screw 4 is supplied to the milling members 10a and 12a to be milled and kneaded in the grooves 11a and 13a during rotation of the shaft 3, and the members 10a and 12a provide a very thorough, homogeneous, fine mixture. During the operation of the press, material is constantly moving from grooves 11a to grooves 13a and back to grooves 11a to provide a very thorough mixing.

Furthermore, the milling in the grooves 11a and 13a produces an additional heating of the material which is very much desired since the press of the invention is designed to handle thermoplastics such as polyvinylchloride, which require such additional heating. Thus, it is possible to choose a length of the milling head 10a which is long enough to produce the desired milling, mixing, and kneading, without producing an undesired amount of such action. In other words, if too much milling and kneading and mixing takes place, then it is only necessary to provide a shorter milling head, and furthermore the length of the milling head controls the amount of heat generated. The heat which is generated with the milling elements 10a and 12a is sufficient to guarantee that the extruded material leaves the nozzle 15a with a temperature high enough to avoid the necessity of any additional heating apparatus.

It is also possible to control the heat produced by milling elements 10a and 12a by axially shifting milling head 10a in casing 12a so as to regulate the gap between these elements and thus change the frictional forces acting on the material so as to generate a desired amount of heat. For this purpose the shaft 3 is axially adjustable within the housing 1 so that the milling head 10a which is fixed to the shaft 3 is also adjusted axially. Thus, a collar 21 is fixed to the shaft 3 and is located within a space defined between the two plates 22 through which the shaft 3 passes, as indicated in Fig. 1. Because of this arrangement the shaft 3 can turn with respect to the plates 22 but cannot shift axially with respect to the same. The plate 22 located nearest to the worm screw 4 has a cylindrical projection 23 which extends with a close fit into the housing 1 and is axially slidable therein. Screws 24 interconnect the plates 22 to the housing 1, and discs, shims, spacers, and the like, indicated at 25, may be located between housing 1 and plates 22 so that these plates 22 may be drawn up to such spacing elements for closely regulating the gap between elements 10a and 12a, and thus the temperature of the extruded mass may be controlled. Of course, it is possible to provide this adjustment in other ways, such as by threadedly connecting the right plate 22 of Fig. 1 to the housing 1, and with this arrangement it is possible to adjust the above gap, and therefore the temperature, during operation of the press.

It is important for proper milling and kneading of the mass that the transfer from shaft 3 to the milling head 10a as well as from the latter to the milling head end portion 20a and the transfer from housing 1 to casing 12a as well as from the latter to nozzle 15a be formed in such a way as to produce the desired flow of material without any dead spaces in which the mass may be retained for a long period of time so as to decompose. It is evident that the above-described structure meets these requirements.

The embodiment of Fig. 2 corresponds essentially to that of Fig. 1. However, instead of providing a milling head and casing which taper toward the outlet of the press, with the embodiment of Fig. 2 the milling head 10b is cylindrical and is formed with grooves 11b identical with grooves 11a. Also, a cylindrical casing 12b closely surrounds the head 10b and is formed with axially extending inner grooves 13b identical with grooves 13a. The milling head end portion 20b of the embodiment of Fig. 2 is cylindrical and extends into the cylindrical bore 19b of nozzle 15b which terminates at the outlet 9b. It will be noted that in the embodiment of Fig. 2 the milling head end portion 20b terminates in the region of the outlet end 9b of the nozzle 15b. The embodiment of Fig. 2 is particularly suited for extruding elongated hollow bodies of large diameter, and it is evident that, if desired, the milling head end portion 20b may have a diameter larger than that of the milling head 10b. With the embodiment of Fig. 2 there are also no dead spaces so that the extruded material flows continuously toward the outlet 9b and is milled and kneaded by elements 10b and 12b. Of course, with the embodiment of Fig. 2 it is not possible to adjust the gap between elements 10b and 12b by axial shifting shaft 3. The casing 12b is coaxially fixed to housing 1 and nozzle 15b with elements 17b which are similar to elements 17a and 17' described above.

The embodiment of the invention shown in Fig. 3 includes a cylindrical milling head 10c fixed coaxially to the shaft 3' which is identical with shaft 3 except that it is formed with an axial bore 26 which extends not only through the shaft 3' but also through the milling head 10c and the milling head end portion 20c fixed coaxially thereto. The milling head 10c has a diameter equal to that of the shaft 3' and is formed with grooves 11c identical with the grooves 11b. The milling casing 12c closely surrounds the milling head 10c and is formed in its interior face with axially extending grooves 13c identical with the grooves of the above-described milling casings. However, it will be noted that the casing 12c has a wall thickness greater than that of the embodiments of Figs. 1 and 2 and the left end of casing 12c, as viewed in Fig. 3, is formed as a cylindrical projection 17c extending with a close fit into the housing 1 and having a funnel-shaped end face which provides a continuous flow of material through the press, without any dead spaces, to the milling and kneading structure, this projection 17c also serving to center the casing 12c with respect to tubular housing 1. The nozzle 15c is formed with a conical inner surface 19c corresponding to the shape of milling head end portion 20c, and the nozzle 15c terminates in the outlet end 9c. Flanges 14c and screws 16 serve to connect casing 12c to housing 1 and nozzle 15c in the same way as was described above, and with the embodiment of Fig. 3 instead of an annular projection similar to projection 17' of Fig. 1, both casing 12c and nozzle 15c are formed with annular grooves into which a ring 18 extends for centering elements 12c and 15c with respect to each other.

The embodiment of Fig. 3 is suitable for continuously embedding a wire or cable 27 in the extruded mass. The wire 27 is continuously supplied in any known way into the bore 26 and moves through the latter toward and out of the outlet 9c. The extruded material is thus formed about the elongated member 27, and it will be noted that the taper of milling head end portion 20c prevents formation of dead spaces.

The embodiments of Figs. 1–3 described above are suited for a raw material composed of relatively fine particles. However, it is frequently necessary to work a raw material made up of coarse particles, and the milling action of the structures described above is not always sufficient for this purpose. The result is that if the particles are too coarse, the milling process takes too long and the flow of mass through the press is retarded. In order to provide a press capable of guaranteeing a large output even for a raw material composed of coarse particles, the grooves 11a—11c and/or grooves 13a—13c of the above milling heads and casing, respectively, are altered so that at their inlet ends they diverge outwardly toward the worm screw 4, as by being provided at their inner ends with a gradually increasing depth and/or a gradually increasing width. In this way it is possible to comminute even large and hard pieces of raw material quickly and reliably while avoiding any stoppage in the flow of material, and thus a large output and a high speed of material flow is guaranteed. Furthermore, with such an expedient the material flow is extremely uniform so that in spite of the increased rate of production there is also an increase in quality, particularly with respect to the dimensional stability of the finished product.

In the embodiment shown in Fig. 5 the worm screw 4 is fixed to the shaft 3 and located within the housing 1 in the same way as with the above described embodiments, and the unillustrated part of the structure 5 is identical with that described above. The embodiment of Fig. 5 includes a milling head 10d coaxially fixed to the shaft 3, as by being formed integrally therewith, and the milling head 10d is formed with axial grooves 11d of substantially semi-circular cross-section similar to those described above. The milling head 10d is closely surrounded by the milling casing 12d whose flanges 14d are joined to the housing 1 and nozzle 15d with screws 16. The embodiment of Fig. 5 includes a milling head and milling casing of frusto-conical shape in the same way as the embodiment of Fig. 1, and the casing 12d is formed with axial grooves 13d similar to those described above. Of course shaft 3 may be axially shifted for regulating the gap between the milling head and casing of Fig. 5, and a milling head end portion 20b of conical configuration is fixed coaxially to milling head 10d, as by being formed integrally therewith, and extends into the nozzle 15d and terminates short of the outlet end 9d of the nozzle 15d.

The central portions of the grooves 11d and 13d as well as the portions thereof in the region a, where casing 12d is joined to nozzle 15d, have a uniform depth and width in the same way as the above described grooves and as illustrated in Fig. 4. However, at the inlet region e of these grooves they become gradually deeper as they approach the worm screw 4 and they may also become gradually wider so that the milling head 10d and casing 12d are capable of quickly and reliably comminuating large and hard pieces. The bottom surfaces of grooves 11d and 13d are advantageously rounded in the same way as the grooves of Fig. 4 and proceed without any shoulders or steps from the region of worm screw 4 to the region of milling members 10d and 12d and from the latter to the nozzle 15d so that dead spaces are avoided. In order not to reduce the comminuting ability of the press and still not form any dead spaces it may be of advantage to begin the diverging of the inlet ends of grooves 11d at a plane axially spaced from the plane where the grooves 13d start to diverge toward the worm screw. The substantially conical milling head end portion 20d of course eliminates any dead spaces in the nozzle 15d.

The embodiment of Fig. 6 is essentially the same as that of Fig. 5 except that the milling head 10e and casing 12e are cylindrical. With this embodiment the grooves 11e and 13e may start to diverge toward the worm screw 4 in the same transverse plane y. Except for the cylindrical shape of the milling structure of Fig. 6, all parts are the same as that of Fig. 5 and are indicated with the same numerals followed by e rather than d.

It is not necessary in all cases to provide diverging inlet ends on the grooves of both the milling head and milling casing. Thus, Fig. 7 shows an embodiment where only the grooves 13f of casing 12f are formed with diverging inlet ends in the region e. The casing 12f is centered with respect to the housing 1 and nozzle 15f by rings 18 located in mating annular grooves of these parts, as indicated in Fig. 7, and the casing 12f has flanges 14f joined to flanges of housing 1 and nozzle 15f by the screws 16. The grooves 11f of the milling head 10f are of uniform depth and width along their entire length.

The embodiment of Fig. 7 also differs from the above described embodiments in that the milling head 10f is removably connected to the shaft 3f which is identical with shaft 3 except for the manner in which the milling head is mounted. Thus, the shaft 3f is provided with a threaded portion 28 which is threadedly connected to a threaded bore portion formed in the milling head 10f. Inasmuch as threads cannot be relied upon for accurate centering, it is necessary to provide an additional means for guaranteeing that milling head 10f is coaxial with the axis $x$ of the shaft 3f. For this purpose the milling head 10f is formed with cylindrical bore portions 29 into which cylindrical portions of the shaft 3f fit with a close tolerance. The threads 28 are preferably wound in the opposite direction to the winding of the worm screw 4 so that during operation of the press the milling head 10f will not tend to become unscrewed from the shaft 3f. Furthermore, a cross pin 30 passes through aligned bores of milling head 10f and shaft 3f to prevent relative turning between these elements. If desired, a set screw or the like could be used for this purpose.

Inasmuch as the casing 12f is removably connected to the housing 1, it is possible to exchange the milling and kneading structure shown in Fig. 7 with a different milling and kneading structure which can be attached to the same housing 1. Thus, instead of the frusto-conical casing 12f and milling head 10f shown in Fig. 7, it is possible to use cylindrical elements of the type described above. Thus, it is possible to provide products of the most varied composition and properties by exchanging only the structure shown in Fig. 7 connected to the housing 1 and shaft 3f.

With the embodiment of Fig. 7 a substantially conical milling head end portion 20f is fixed to the milling head 10f, extends into the nozzle 15f, and terminates short of its outlet 9f, the outer surface of end portion 20f corresponding to the inner conical surface 19f of nozzle 15f and extending only in the direction of material flow so as to be free of any dead spaces.

Of course, the above described features are not suitable exclusively for presses having horizontal worm screws. The same results are obtainable with vertical worm screws or with worm screws having any inclination.

It will be understood that each of the elements described above, or two or more together, may also find a useful application in other types of extrusion presses differing from the types described above.

While the invention has been illustrated and described as embodied in an extrusion press free of dead spaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves having uniform cross sections over the major part of the length thereof; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

2. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves having uniform cross sections over the major part of the length thereof; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a conical nozzle fixed coaxially to said outlet end of said casing; and a conical milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

3. An extrusion press comprising, in combination, a tubular housing having an open outlet end; a shaft coaxial with said housing, turnably carried thereby, extending along the interior thereof; a worm screw fixed to said shaft for rotation therewith and extending therefrom toward the inner surface of said housing; a milling head having the shape of a truncated cone, coaxially fixed at its larger end to said shaft for rotation therewith and located beyond said outlet end of said housing, said milling head being formed in its outer surface with axially extending grooves having uniform cross sections over the major part of the length thereof; a tubular milling casing also having the shape of a truncated cone closely surrounding said milling head and fixed at its larger end coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a conical nozzle fixed coaxially to said outlet end of said casing; and a conical milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

4. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head having the shape of a truncated cone, coaxially fixed at its larger end to said shaft for rotation therewith and located beyond said outlet end of said housing, said milling head being formed in its outer surface with axially extending grooves having uniform cross sections over the major part of the length thereof; a tubular milling casing also having the shape of a truncated cone closely surrounding said milling head and fixed at its larger end coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

5. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head having the shape of a truncated cone, coaxially fixed at its larger end to said shaft for rotation therewith and located beyond said outlet end of said housing, said milling head being formed in its outer surface with axially extending grooves having uniform cross sections over the major part of the length thereof; a tubular milling casing also having the shape of a truncated cone closely surrounding said milling head and fixed at its larger end coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle; and adjusting means operatively connected to said shaft for adjusting the axial position thereof in said tubular housing so as to adjust the clearance between said milling head and milling casing.

6. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves having uniform cross sections over the major part of the length thereof; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle, said shaft, milling head, and milling head end portion all being formed with a single continuous axial bore having opposite open ends so that an elongated member may pass through said bore to be automatically embedded in material extruded through said nozzle.

7. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a cylindrical milling head coaxially fixed to said shaft for rotation therewith and located beyond said outlet end of said housing, said milling head being formed in its outer surface with axially extending grooves having uniform cross sections over the major part of the length thereof; a cylindrical milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

8. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a cylindrical milling head of the same diameter as said shaft coaxially fixed to said shaft for rotation therewith and located beyond said outlet end of said housing, said milling head being formed in its outer surface with axially extending grooves having uniform cross sections over the major part of the length thereof; a cylindrical milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

9. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a cylindrical milling head coaxially fixed to said shaft for rotation therewith and located beyond said outlet end of said housing, said milling head being formed in its outer surface with axially extending grooves having uniform cross sections over the major part of the length thereof; a cylindrical milling casing closely surrounding said milling head and fixed coaxially to said outlet end of said tubular housing, said casing having a funnel-shaped inner surface located at said outlet end of said housing, being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

10. An extrusion press comprising, in combination, a tubular housing having an open outlet end; a shaft coaxial with said housing, turnably carried thereby; and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves of substantially semi-circular cross section intersecting said outer surface with sharp edges; a tubular milling casing closely surrounding said milling head and fixed coaxially to said outlet end of said tubular housing, said casing being formed in its inner face with axially extending grooves of substantially semi-circular cross section intersecting said inner face with sharp edges and intersecting said outer surface with sharp edges having an open outlet end distant from said outlet end of said housing; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

11. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head removably fixed coaxially to said shaft for rotation therewith and located beyond said outlet end of said housing, said milling head being formed in its outer surface with axially extending grooves having uniform cross sections over the major part of the length thereof; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

12. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head removably fixed coaxially to said shaft for rotation therewith and located beyond said outlet end of said housing, said milling head being formed in its outer surface with axially extending grooves having uniform cross sections over the major part of the length thereof; a tubular milling casing closely surrounding said milling head and removably fixed coaxially to said outlet end of said tubular housing, said casing being formed in its inner face with axially extending grooves having uniform cross sections over the major part of the length thereof and said casing having an open outlet end distant from said outlet end of said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

13. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves respectively having uniform cross sections over the major part of the length thereof and having inlet ends which diverge gradually toward said shaft; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, said grooves of said casing also respectively having inlet ends which diverge gradually toward said housing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

14. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head coaxially fixed to said shaft for rotation therewith and located beyond said outlet end of said housing, said milling head being formed in its outer surface with axially extending grooves respectively having uniform cross sections over the major part of the length thereof and having inlet ends which diverge gradually toward said shaft and merge smoothly into said milling head; a tubular milling casing closely surrounding said milling head and fixed coaxially to said outlet end of said tubular housing, said casing being formed in its inner face with axially extending grooves having uniform cross sections over the major part of the length thereof and said casing having an open outlet end distant from said outlet end of said housing, said grooves of said casing also respectively having inlet ends which diverge gradually toward said housing and merge smoothly into said casing, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing; and a milling head end portion fixed coaxially to the portion of the milling head within said casing and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

15. An extrusion press comprising, in combination, a tubular housing having an open outlet end; a shaft coaxial with said housing, turnably carried thereby, and extending along the interior thereof; a worm screw fixed to said shaft for rotation therewith and extending therefrom toward the inner surface of said housing; a milling head member coaxially fixed to said shaft for rotation therewith and located beyond said outlet end of said housing, said milling head member being formed in its outer surface with axially extending grooves having uniform cross sections over the major part of the length thereof; a tubular milling casing member closely surrounding said milling head member and fixed coaxially to said outlet end of said tubular housing, said casing member being formed in its inner face with axially extending grooves having uniform cross sections over the major part of the length thereof and said casing having an open end distant from said outlet end of said housing, the grooves of one of said members respectively having inlet ends which diverge gradually toward said worm screw, each of said grooves of said milling head forming, when aligned during the turning of the latter with any of said grooves in said casing, together with said groove in said casing a channel of substantially circular cross section substantially parallel to a generatrix of said outer surface of said milling head; a nozzle fixed coaxially to said outlet end of said casing member; and a milling head end portion fixed coaxially to the portion of the milling head member within said casing member and extending therefrom into said nozzle, said milling head end portion having an outer surface spaced from and corresponding to the shape of the inner surface of said nozzle and extending only in the direction of material flow so that there are no dead spaces between the nozzle and milling head end portion in which material can remain without moving out through said nozzle.

References Cited in the file of this patent

UNITED STATES PATENTS

| | | |
|---|---|---|
| 1,608,980 | Gordon | Nov. 30, 1926 |
| 1,935,050 | Gordon | Nov. 14, 1933 |
| 2,286,405 | Gordon | June 16, 1942 |
| 2,370,952 | Gordon | Mar. 6, 1945 |
| 2,595,455 | Heston | May 6, 1952 |